(12) United States Patent
Patel et al.

(10) Patent No.: US 9,054,829 B2
(45) Date of Patent: Jun. 9, 2015

(54) SPECTRUM AWARE RATE SELECTION PROCEDURE FOR OPTICAL CHANNELS IN FLEXIBLE WDM NETWORKS

(71) Applicant: NEC Laboratories America, Inc., Princeton, NJ (US)

(72) Inventors: Ankitkumar Patel, Plainsboro, NJ (US); Philip Ji, Plainsboro, NJ (US); Daisuke Taniguchi, Abiko (JP); Yoshiaki Aono, Abiko (JP)

(73) Assignee: NEC Laboratories America, Inc., Princeton, NJ (US)

( * ) Notice: Subject to any disclaimer, the term of this patent is extended or adjusted under 35 U.S.C. 154(b) by 133 days.

(21) Appl. No.: 13/939,608

(22) Filed: Jul. 11, 2013

(65) Prior Publication Data

US 2014/0016939 A1    Jan. 16, 2014

Related U.S. Application Data

(60) Provisional application No. 61/670,190, filed on Jul. 11, 2012.

(51) Int. Cl.
*H04J 14/02* (2006.01)

(52) U.S. Cl.
CPC ......... *H04J 14/0227* (2013.01); *H04J 14/0224* (2013.01); *H04J 14/0257* (2013.01); *H04J 14/026* (2013.01); *H04J 14/0267* (2013.01)

(58) Field of Classification Search
USPC ....................................................... 398/45–57
See application file for complete search history.

(56) References Cited

U.S. PATENT DOCUMENTS

| | | | |
|---|---|---|---|
| 8,781,328 B2 * | 7/2014 | Patel et al. ...................... 398/79 |
| 2007/0237092 A1 * | 10/2007 | Balachandran et al. ...... 370/254 |
| 2008/0088915 A1 * | 4/2008 | Hayashi et al. ................ 359/334 |
| 2008/0107429 A1 * | 5/2008 | Galli et al. ..................... 398/188 |
| 2008/0108365 A1 * | 5/2008 | Buddhikot et al. ......... 455/452.1 |
| 2009/0052570 A1 * | 2/2009 | Haykin ......................... 375/267 |
| 2012/0069856 A1 * | 3/2012 | Patel et al. ..................... 370/480 |
| 2012/0070148 A1 * | 3/2012 | Patel et al. ..................... 398/49 |
| 2012/0201541 A1 * | 8/2012 | Patel et al. ..................... 398/58 |
| 2012/0230267 A1 * | 9/2012 | Sundaresan et al. .......... 370/329 |
| 2012/0251117 A1 * | 10/2012 | Patel et al. ..................... 398/79 |
| 2013/0242932 A1 * | 9/2013 | Tiirola et al. ................. 370/329 |
| 2013/0272711 A1 * | 10/2013 | Patel et al. ..................... 398/79 |
| 2014/0016939 A1 * | 1/2014 | Patel et al. ..................... 398/79 |
| 2014/0029939 A1 * | 1/2014 | Patel et al. ..................... 398/34 |
| 2014/0226986 A1 * | 8/2014 | Patel et al. ..................... 398/83 |

\* cited by examiner

*Primary Examiner* — Agustin Bello
(74) *Attorney, Agent, or Firm* — Joseph Kolodka

(57) ABSTRACT

A spectrum-aware rate selection includes finding a set of channels based on spectrum availability information such that the total required spectrum for a requested data rate of a traffic demand is minimized.

20 Claims, 4 Drawing Sheets

SPECTRUM AWARE RATE SELECTION PROCEDURE FOR OPTICAL CHANNELS IN FLEXIBLE WDM NETWORKS

RELATED APPLICATION INFORMATION

This application claims priority to provisional application Ser. No. 61/670,190 filed on Jul. 11, 2013, the contents thereof are incorporated herein by reference.

BACKGROUND

The present invention relates optical communications, and, more particularly, to spectrum aware rate selection for optical channels in flexible wavelength division multiplexing WDM.

In conventional wavelength division multiplexing (WDM) optical networks, the spectrum allocation to the WDM channels (determined from the channel spacing) is fixed, and remains the same throughout the network operations. These channels are centered on standard ITU-T channel grid such as specified according to ITU-T standard G.694.1 [ITU-T]. We refer to such networks as the fixed grid optical WDM networks. In fixed grid networks, the fixed amount of spectrum is assigned to all connections irrespective of their data rates, which may lead to an inefficient utilization of spectral resources (FIG. 1(a)). Such a network is rigid and cannot provide optimum spectral efficiency.

Envisioning the requirement for higher spectral efficiency to support the future traffic volume, there has been several efforts for relaxing the constraint of fixed spectral allocation in optical WDM networks, which we refer as Flexible optical WDM networks (FWDM). The FWDM networks consist of optical channels supporting heterogeneous line rates using variable amounts of spectrum as shown in FIG. 1(b) as opposed to fixed grid networks.

A flexible spectrum assignment in FWDM networks improves spectral efficiency by avoiding over-provisioning of spectral resources for the sub-wavelength granularity traffic and guard bands between multiple channels used to support the super-wavelength granularity traffic compared to fixed grid networks. For example, instead of allocating 50 GHz of spectrum to a channel with 10 Gb/s line rate as in fixed grid networks, 25 GHz of optimum spectrum is allocated to the channel in FWDM networks. On the other hand, instead of establishing four 100 Gb/s channels using 200 GHz of spectrum (including guard bands) for 400 Gb/s data rate, a single channel of 400 Gb/s line rate can be established within continuous 75 GHz of spectrum by eliminating guard bands. On the other hand, due to the flexibility in spectrum allocation, a control plane in FWDM networks must observe additional (1) spectral continuity constraint which is defined as an allocation of the same amount of spectrum on each link along the route, and (2) spectral conflict constraint which is defined as non-overlapping spectrum allocation to channels routed over the same fiber, along with the conventional (3) wavelength continuity constraint which is defined as an allocation of spectrum at the same center wavelength over all links along the route while provisioning channels. In a dynamic traffic scenario, statistical arrivals and departures of channels with heterogeneous spectral requirements leads to spectral fragmentation that partitions the continuous spectral band into smaller spectral-islands as shown in FIG. 2. channel may be blocked over a fiber in spite of an availability of sufficient amount of spectrum for the channel if the available spectrum is fragmented and not continuous.

Additionally, this channel blocking further increases in the network due to the observance of the wavelength continuity, spectral continuity, and spectral conflict constraints if the channel is routed over multiple fragmented fibers. To alleviate the blocking in such a fragmented network, one of the solutions is to split the requested data rate into multiple low-rate channels based on the availability of spectrum over fibers and the offered line rates in the network. Thus, the problem is that for a given requested data rate and given spectrum availability profile of each link in the network, how to select a set of channels such that the total line rate offered by the set of channels meets or exceeds the requested rate while minimizing the total spectrum required by the set of channels. We refer this problem as the spectrum-aware channel selection problem.

In FWDM networks, the spectrum profile of a fiber can be continuous or discrete in the frequency domain. Since a continuous spectrum profile may cause significant management and control plane overheads, network operators prefer to maintain a discrete spectrum profile with sufficient granularity such that network performance is not sacrificed. In a discretized spectrum profile, the smallest unit of spectrum is referred to as a wavelength slot. The spectrum of a channel is defined in terms of the number of consecutive wavelength slots. A wavelength slot can be either in an available state or in an occupied state. The state of this discretized spectrum of a fiber connecting nodes i and j is referred to as the spectrum availability profile and denoted as $C_{ij}^{t}$, where $C_{ij}^{t}=1$ denotes that a wavelength slot t is available and $C_{ij}^{t}=0$ denotes that a wavelength slot t is occupied over the fiber (i, j).

The spectrum-aware channel selection problem is formally defined as follows. Consider a physical network topology G(V, E), where V is a set of ROADM nodes and E is a set of fiber links connecting a pair of nodes. The network offers a set of line rates L, and each line rate l∈L requires $X_l$ GHz of spectrum. The spectrum availability profile $C_{ij}^{t}$ of each link (i, j)∈E is given. We need to find channels for a traffic demand R(s, d, r), where s is a source node, d is a destination node, and r is the requested data rate in Gb/s, such that total required spectrum for these channels is minimum while supporting the requested data rate r.

In fixed grid networks, since the same amount of spectrum is assigned to all channels and the channel center frequency is fixed, the minimum granularity at which spectrum is fragmented is the standardized channel spacing. This channel spacing is used to support a channel with any granularity in the network. Thus, the total required spectrum by a set of channels can be determined as follows.

Total Spectrum=Number of channels*Spectrum of a channel

Since the spectrum of all channels is fixed and the same, to minimize the total spectrum, we need to minimize the total number of channels required for the given data rate. Thus, the object of the spectrum-aware channel selection problem is equivalent to minimize the total number of channels to support the data rate of a traffic demand. The spectrum-aware channel selection problem in fixed grid networks can be trivially solved by selecting channels with the maximum line rate, which minimizes the total number of channels for the given data rate.

However, since the spectrum assignment to channels in FWDM networks is flexible, spectrum is fragmented at any granularity; and thus, the channel selection problem becomes more general than in fixed grid networks. The solution of the spectrum-aware channel selection problem in fixed grid networks may not be the solution of the problem in FWDM networks.

Applicants have proposed previously, a rate selection procedure to determine line rates of channels for the requested data rate in FWDM networks. This procedure finds an optimum set of line rates for channels such that the required spectrum is minimized. However, this rate selection procedure does not take into account spectral-islands of the network while selecting line rates for channels. Thus, if the fragmented spectrum profiles of fiber links along the route do not have spectral-islands of sizes at least larger than the spectrum required by a channel, then the channel ends up being blocked. Thus, a selection of line rates without using the information of spectrum availability may lead to higher network blocking.

Accordingly, to avoid the aforementioned blocking, there is a need for a spectrum-aware rate selection procedure that finds a set of line rates for channels based on spectral-islands in the network with the goal of minimizing the required spectrum.

SUMMARY OF THE INVENTION

A method for spectrum-aware rate selection includes finding a set of channels based on spectrum availability information such that the total required spectrum for a requested data rate of a traffic demand is minimized. The method also includes finding routes and spectral islands along network routes connecting source and destination nodes while observing spectral continuity and wavelength continuity responsive to an auxiliary graph based approach, finding available spectral islands along links in a single scan of spectrum availability profiles, and finding a route which maximizes a minimum width of a spectral island along the route responsive to a Max-Min Weight procedure.

In an alternative aspect of the same invention, there is provided a an optical network system with computer implemented spectrum-aware rate selection that includes code instructions implemented by a computer for finding a set of channels based on spectrum availability information such that the total required spectrum for a requested data rate of a traffic demand is minimized, which includes code instructions on the computer for finding routes and spectral islands along network routes connecting source and destination nodes while observing spectral continuity and wavelength continuity responsive to an auxiliary graph based approach, code instructions on the computer for finding available spectral islands along links in a single scan of spectrum availability profiles, and code instructions the computer for finding a route which maximizes a minimum width of a spectral island along the route responsive to a Max-Min Weight procedure.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Figure 1:
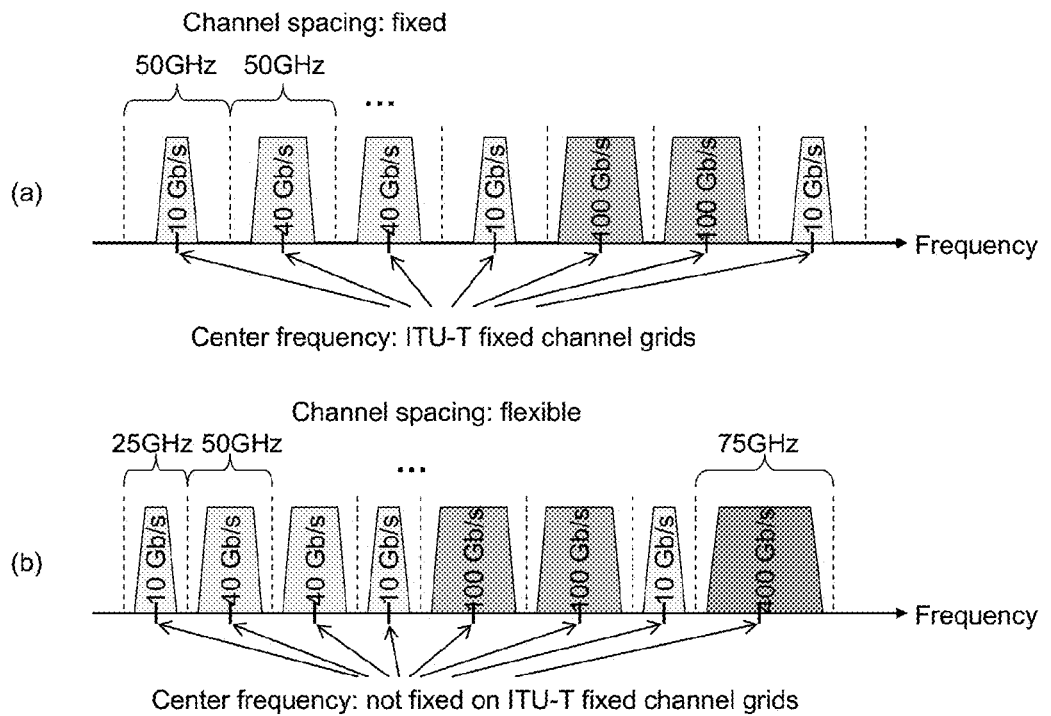
FIG. 1 is a diagram comparing (a) fixed grid WDM network and (b) a flexible WDM network.
Figure 2:
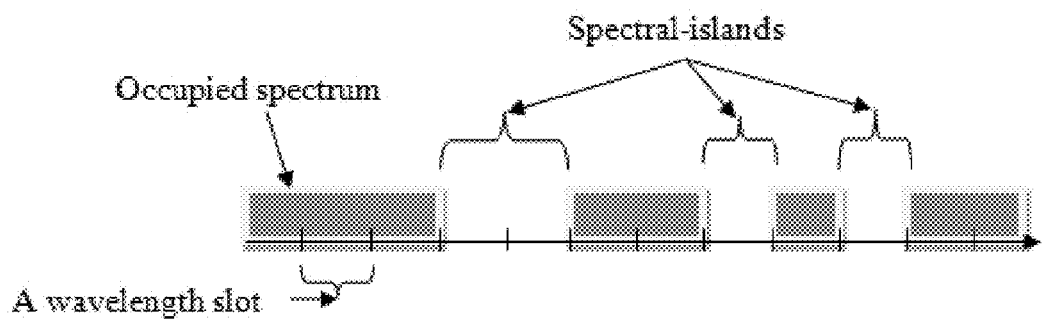
FIG. 2 is a depiction of fragmented spectrum of an optical fiber.

The present invention is directed to a spectrum-aware rate selection that is recursive in which a solution of the data rate is obtained using the solutions of lower data rates.

We denote L as the set of line rates offered in an FWDM network, $X_l$ as the required spectrum for a channel with a line rate l∈L, r as the data rate of a traffic demand, $U_n$ as the total required spectrum for a data rate n, $K_n$ as the optimal set of line rates for channels that support a data rate n, Z as the set widths of spectral-islands along the routes connecting the source node s and the destination node d, P as a line rate that is selected for a channel, Q as a data rate whose solution is used to determine the solution of a data rate n under consideration, $C_{ij}{}'$ as the spectrum availability profile of a link (i, j), $M_{ij}$ as the maximum wavelength slot starting from the current wavelength slot up to which all wavelength slots are occupied in the spectrum availability profile of a link (i, j), $T_{ij}$ as the maximum wavelength slot starting from the wavelength slot $M_{ij}$ up to which all wavelength slots are available in the spectrum availability profile of a link (i, j), A as an auxiliary graph in which $A_{ij}$ denotes the width of a spectral island that is available on a link (i, j), $H_i$ as the state of a node i, $B_i$ as the predecessor of a node i, and $W_i$ as the maximum width of a spectral-island along a route connecting the source node s to a node i.

The spectrum-aware rate selection procedure first finds spectral-islands along the routes connecting the source node s to the destination node d in a single scan of the spectrum availability profiles of fibers. The procedure keeps track of spectral-islands using two parameters $M_{ij}$ and $T_{ij}$, where $M_{ij}$ is the lowest wavelength slot of a spectral-island and $T_{ij}$ is the highest wavelength slot of a spectral-island on a fiber (i, j). The procedure starts from the lowest wavelength slot t and constructs an auxiliary graph A. The width of a spectral-island ($T_{ij}-M_{ij}+1$) on a fiber (i, j) stating from the wavelength slot t is considered as a weight $A_{ij}$ of a link (i, j) in the auxiliary graph A. After construction of an auxiliary graph, the Max-Min Weight Procedure is used to find a route Y such that the minimum width u of a spectral-island (weight) of a link along the route is maximized. The Max-Min Weight Procedure returns a route Y and the minimum width u of a spectral-island along the route Y. The width of a spectral-island on each link along the route is at least u and these spectral-islands start at the same wavelength slot t. Thus, these spectral-islands starting from the wavelength slot t have u amount of spectrum on each link along the route (the spectral continuity constraint) at the same center wavelength (the wavelength continuity constraints). The found width u of a spectral-island in the Max-Min Weight Procedure is recorded in the set Z and according to this width u, $M_{ij}$ and $T_{ij}$ parameters are updated. The links along the found route Y are removed from the auxiliary graph A, and the Max-Min Weight Procedure is repeated until the source node s and destination node d are disconnected. After determining all spectral-islands starting from the wavelength slot t, the spectrum-aware rate selection procedure increments the wavelength slot t and repeats the same procedure until the last wavelength slot of a spectrum profile is reached.

The above inventive process yields a set of widths Z of spectral-islands that are available along the routes connecting source and destination nodes. In the next step, the spectrum-aware rate selection procedure finds a set of line rates for the data rate j using the information of spectral-islands Z and the solutions of the lower data rates n, where n<j. In order to find an appropriate set of line rates for the data rate j, the procedure first maps the spectrum of line rates for the data rate n within the widths Z of spectral islands such that the width of a residual spectral-island after the mapping is maximized. A subset of offered line rates is considered in determining the solution for the data rate j, which requires smaller spectrum than the maximum width of a residual spectral-island. The procedure starts from j=1 and repeats the same process until j=r.

Figure 3A:
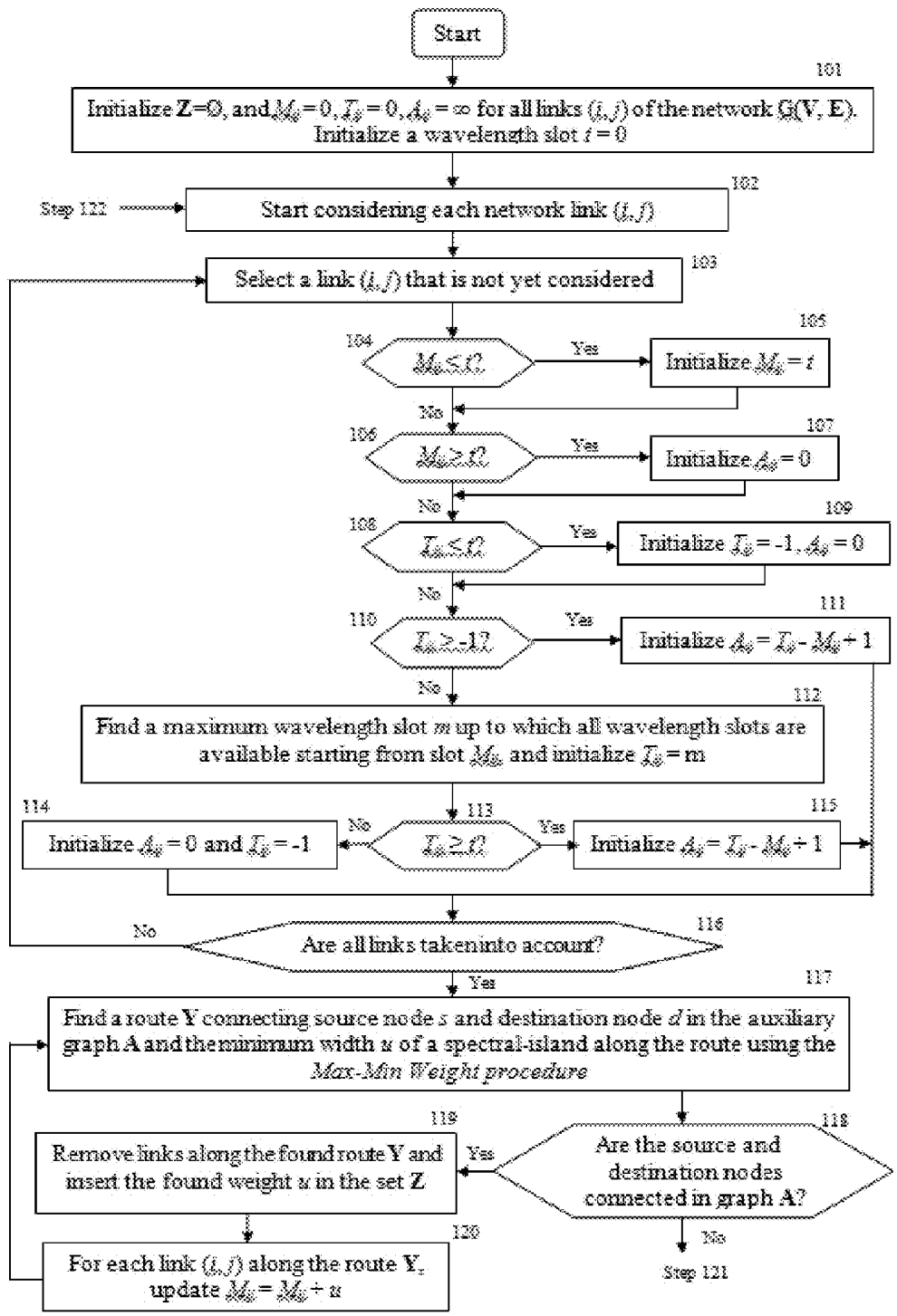
FIGS. 3(a) and (b) is a flow chart of a spectrum aware rate selection, in accordance with the invention.
Figure 3B:
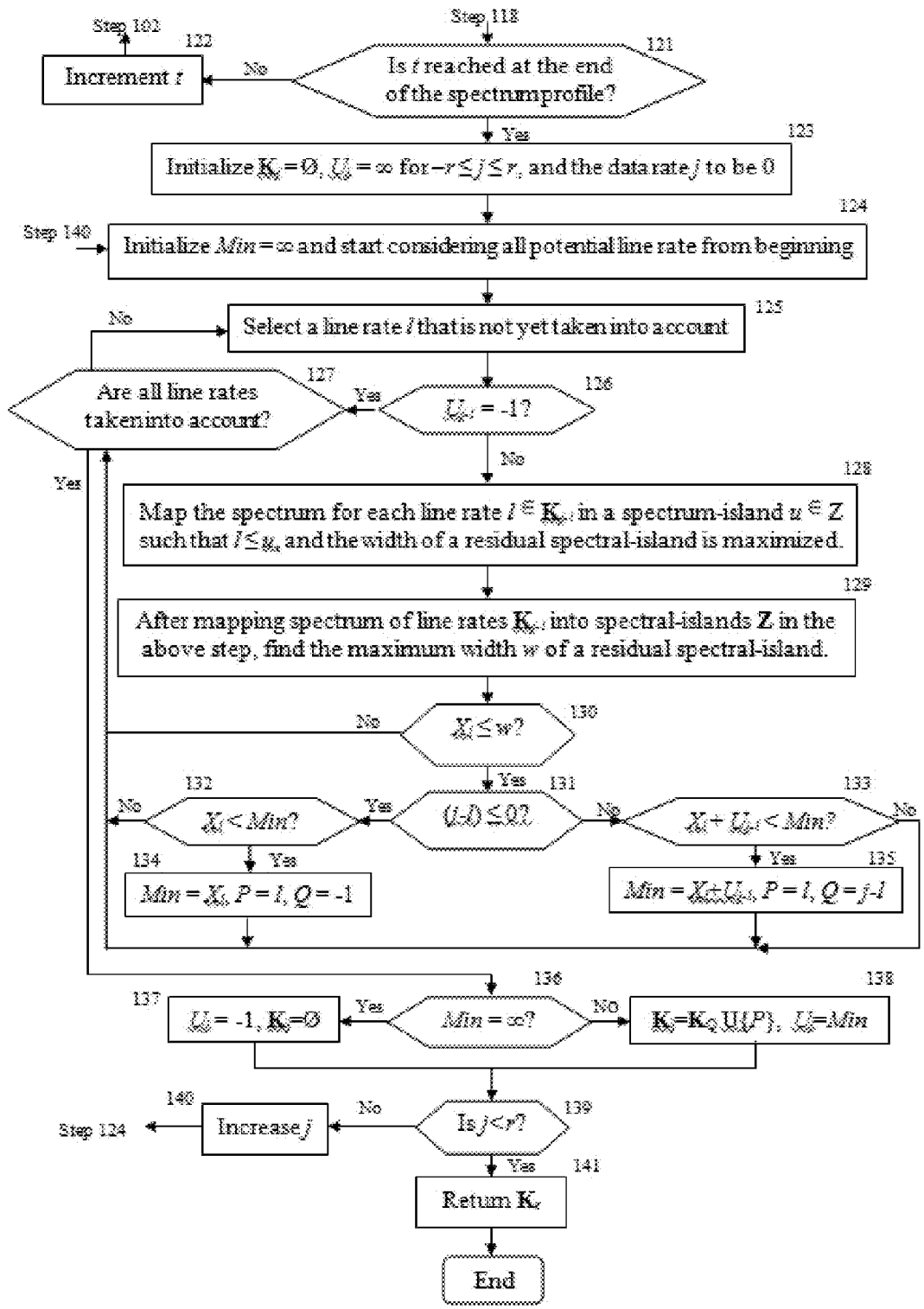

In FIG. 3, there is shown a flow diagram of the inventive spectrum-aware rate selection procedure to find a set of line rates for channels. The diagram is explained detail as follows.

At first, step 101 the invention initializes Z=Ø, and $M_{ij}=0$, $T_{ij}=0$, $A_{ij}=\infty$ for all links (i, j) in the network. Initially, the wavelength slot t is initialized to 0. Then, at the next step, 102, the invention starts considering each link (i, j)∈V for the process. At step 103, the invention selects a link (i, j) that is not yet considered during the process. Followed by step 104, where the invention checks whether $M_{ij}$ is less than the current wavelength slot t. If $M_{ij}$ is less than t, then the procedure follows step 105, otherwise the procedure follows step 106. At step 105, the invention initializes $M_{ij}$ to the current wavelength slot t. At point 106, the invention checks whether $M_{ij}$ is greater than the current wavelength slot t. If $M_{ij}$ is greater than t, then the invention follows step 107, otherwise the invention follows step 108. At step 107, the invention initializes the width of a spectral island on a link (i, j) in the auxiliary graph, $A_{ij}$ to be 0. At step 108, the invention checks whether $T_{ij}$ is less than the current wavelength slot t. If $T_{ij}$ is less than t, then the invention follows step 109, otherwise the invention follows step 110. At step 109, the invention initializes $T_{ij}$ to −1 and $A_{ij}$ to 0. At step 110, the invention checks whether $T_{ij}$ is greater than −1. If $T_{ij}$ is greater than −1, then the invention follows step 111, otherwise the invention follows step 112. At step 111, the invention initializes $A_{ij}$ to ($T_{ij}-M_{ij}+1$) that represents the width of an available spectral-island on link (i, j). At step 112, the invention initializes $T_{ij}$ to the maximum wavelength slot up to which all wavelength slots are available starting from the wavelength slot $M_{ij}$. At step 113, the invention checks whether $T_{ij}$ is greater or equal to the current wavelength slot t. If $T_{ij}$ is smaller than t, then the invention follows step 114, otherwise the invention follows step 115. At step 114, the invention initializes $A_{ij}$ to 0 and $T_{ij}$ to −1. At step 115, the invention initializes $A_{ij}$ to ($T_{ij}-M_{ij}+1$). At step 116, the invention checks whether all links are taken into account. If all links are taken into account, then the invention follows step 117, otherwise the invention repeats step 103.

At step 117, the invention finds a route Y connecting source and destination nodes in the auxiliary graph A such that the minimum width of a spectral-island over the links along the routes connecting source and destination nodes is maximized using the Max-Min Weight Procedure. At step 118, the invention checks whether a route connecting source and destination nodes exists in the auxiliary graph. If a route exists, then the invention follows step 119, otherwise the invention follows step 121. At step 119, the invention removes links along the found route from the auxiliary graph A, and includes the found width u of a spectral-island along the route in the set Z. At step 120, the invention update $M_{ij}$ of each link (i, j) along the found route Y to $M_{ij}+u$.

At step 121, the invention checks whether the current wavelength slot t is reached to the end of the spectrum availability profile. If t is reached at the end of the spectrum availability profile, then the invention follows step 123, otherwise the invention follows step 122. At step 122, the invention increments the current wavelength slot t and repeats step 102.

At step 123, the invention initializes a set of line rates $K_j$ to Ø and minimum spectrum $U_j$ to ∞ for data rate j ranges from −r Gb/s to r Gb/s. The invention also initializes the current data rate j to 0. At step 124, the invention initializes the minimum spectrum for data rate j Min, to ∞, and starts considering each line rate for the process. At step 125, the invention selects a line rate l that is not yet considered. At step 126, the invention checks whether the spectrum required for data rate (j−1), $U_{j-1}$, is −1. If $U_{j-1}$ is not −1, then the invention follows step 128, otherwise the invention follows step 127. At step 127, the invention checks whether all line rates are taken into account. If all line rates are already considered, then the process follows step 136, otherwise the process repeats step 125. At step 128, the process maps the spectrum for each line rate l∈$K_{j-1}$ in spectral-islands u∈Z, such that/is less than or equal to u and the width of a residual spectral-island is maximized. At step 129, after mapping spectral widths of line rates $K_{j-1}$ into spectrum-islands Z, the invention finds the maximum width w of a residual spectral-island. At step 130, the invention checks whether the line rate l requires smaller or equal amount of spectrum than w. If the spectrum of a line rate l fits within the width w, then the invention follows step 131, otherwise step 127 is repeated. At step 131, the invention checks whether the data rate (j−l) is less than or equal to 0. If the data rate is greater than 0, then the invention follows step 133, otherwise the invention follows step 132. At step 132, the invention checks whether the spectrum $X_l$ for a line rate l is smaller than the minimum spectrum Min. If the spectrum for line rate l is smaller than Min, then the invention follows step 134, otherwise the invention repeats step 127. At step 133, the invention checks whether the spectrum $X_l+U_{j-l}$ is smaller than the minimum spectrum Min. If the spectrum $X_l+U_{j-l}$ is smaller than Min, then the invention follows step 135, otherwise the invention repeats step 127. At step 134, the invention initializes the minimum spectrum Min to $X_l$, P to l, and Q to −1. At step 135, the invention initializes the minimum spectrum Min to $X_l+U_{j-l}$, P to l, and Q to (j−l). At step 136, the invention checks whether the minimum spectrum Min is equal to ∞. If Min is not ∞, then the invention follows step 138, otherwise the invention follows step 137. At step 137, the invention initializes the spectrum for data rate j, $U_j$, to −1 and a set of line rates $K_j$ to Ø. At step 138, the invention considers the union of the line rate P and the set of line rates $K_Q$ to obtain the set of line rates $K_j$ for data rate j, and initializes $U_j$ to Min. At step 139, the invention checks whether the data rate j is less than the requested data rate r. If the data rate j is greater than or equal to data rate r, then the invention follows step 141, otherwise the invention follows step 140. At step 140, the invention increments the data rate j and repeats step 124. A step 141, the invention returns the set of line rates $K_r$ for data rate r.

Figure 4:
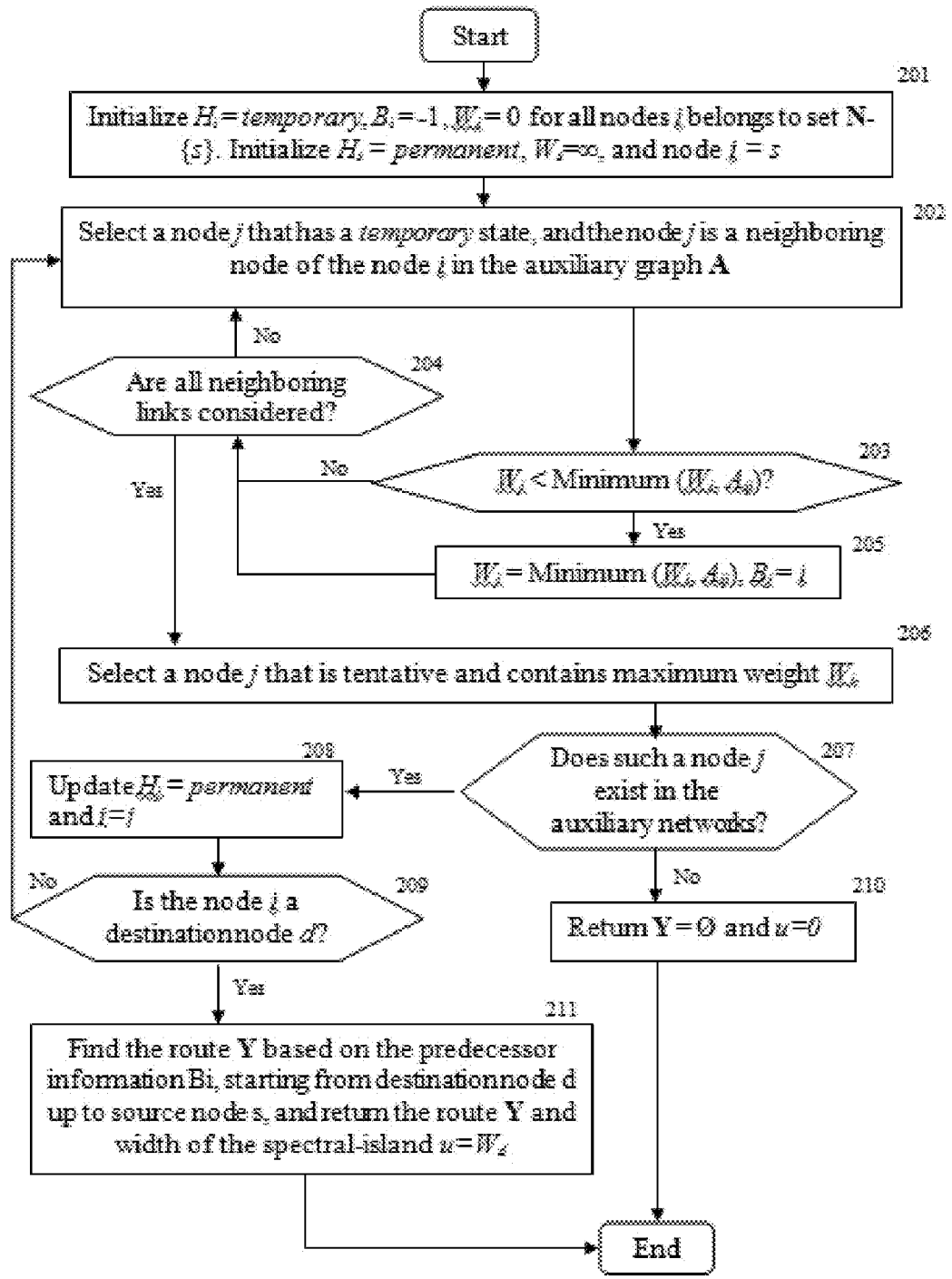
FIG. 4 is a flow chart of the Max-Min weight procedure, in accordance with the invention.

The Max-Min Weight Procedure finds a route such that the minimum width of a spectral island (weight) along the route is maximized in the auxiliary graph. The procedure keeps track of three parameters at each node i, the state of the node $H_i$, the predecessor of the node $B_i$, and the minimum width of a spectral-island along a route connecting source node s to node i, $W_i$. $H_i$ can either be in a temporary state of a permanent state. Initially, the procedure initializes $H_i$ to a temporary state, $B_i$ to −1, and $W_i$ to 0 for each node i excluding the source node s. For the source node s, $H_s$ is initialized to a permanent state and $W_s$ is initialized to infinite. The procedure selects a node i with a permanent state and relaxes all its neighboring nodes. In the relaxation process, if the minimum width of a spectral island along the route passing through the node i is larger than that along any other route, then the parameters of the neighboring node are updated. After relaxation, the procedure finds a node j whose state is temporary and which contains maximum value of $W_j$. The state of the found node j is updated to permanent and the node j is selected for the next iteration. Again the neighboring nodes of the node j are relaxed and this procedure is repeated until either the destination node is reached or the process does not find a node with a temporary state. Finally, the procedure finds a route Y using the predecessor information and the value of $W_d$ represents the minimum width of a spectral-island along the route. In FIG. 4, the flow diagram shown is for the Max-Min Weight Procedure explained in detail below.

At step 201, the invention initializes $H_i$=temporary, $B_i$=−1, $W_i$=0 for all nodes i $\in$V−{s} and $H_s$ permanent, $W_s$=∞ for the source node s. The procedure selects the source node s (i=s). At step 202, the invention selects a node j that has a temporary state, and the node is a neighboring node of the node i. At step 203, the invention checks whether $W_j$ is smaller than the minimum of $W_i$ and $A_{ij}$. If $W_j$ is smaller than the minimum of $W_i$ and $A_{ij}$, then the procedure follows step 204, otherwise the procedure follows step 205. At step 204, the invention checks whether all neighboring nodes of the node i taken into account. If a neighboring node is not yet considered, then the procedure repeats step 202, otherwise the procedure follows step 206. At step 205, the invention assigns the minimum of $W_i$ and $A_{ij}$ to $W_j$ and the node i is assigned to $B_j$. At step 206: After considering all neighboring nodes, the procedure selects a node j whose status is temporary and which has maximum value of $W_j$. At step 207, the invention checks whether a node j exists whose status is temporary. If such a node exists, then the procedure follows step 208, otherwise the procedure follows step 210. At step 208, the invention updates the state of node j to permanent, and selects the node j for the next iteration (i=j). At step 209, the invention checks whether the selected node i is the destination node d. If the node i is the destination node, then the procedure follows step 211, otherwise the procedure repeats step 202. At step 210, the invention initializes Y to Ø, u to 0, and returns these parameters. At step 211, the invention finds the route Y by tracing $B_i$ values starting from the destination node d up to the source node s, and returns Y and $B_d$ parameters.

From the foregoing it can be seen that the present invention provides a number of substantial benefits. The invention is applicable in control planes of optical networks. The procedure finds line rates for channels before establishing them through a signaling procedure. Since the spectrum-aware rate selection procedure is a part of a control plane, the proposed procedure can be used in distributed elements such as optical nodes, or centralized elements such as the Path Computation Elements (PCEs) and open flow controllers.

1. The spectrum-aware rate selection procedure finds line rates for channels of a traffic demand such that the required spectrum to support the requested data rate is minimal.
2. The spectrum-aware rate selection procedure finds line rates for channels of a traffic demand using the information of spectrum-islands in the network, and reduces the probability of blocking a channel and its respective traffic demand compared to the rate selection procedure.
3. The spectrum aware rate selection procedure improves spectral efficiency and traffic carrying capacity of the network.
4. The spectrum-aware rate selection procedure is fast.
5. The spectrum-aware rate selection procedure finds an optimal set of line rates for channels in a network with spectral-islands of sufficiently sizes.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for spectrum-aware rate selection comprising the steps of:
   i) finding by a signal processor a set of channels based on spectrum availability information such that the total required spectrum for a requested data rate of a traffic demand is minimized in a wavelength division multiplexing optical network having a physical network topology with a set of Reconfigurable Optical Add Drop Multiplexer (ROADM) nodes and a set of fiber links connecting a pair of nodes, which includes
   ii) finding routes and spectral islands along optical network routes connecting source and destination nodes while observing spectral continuity and wavelength continuity responsive to an auxiliary graph based approach;
   iii) finding available spectral islands in the optical network along links in a single scan of spectrum availability profiles; and
   iv) finding a route which maximizes a minimum width of a spectral island along the route responsive to a Max-Min Weight procedure.

2. The method of claim 1, further comprising iv) finding a set of line rates for a given data rate using solutions of the smaller data rates and available spectral-islands.

3. The method of claim 2, wherein said step iv) comprises selecting a subset of an offered set of line rates in determining a solution for the data rate using the solutions of the smaller data rates and the available spectral-islands.

4. The method of claim 2, wherein said step iv) comprises selecting a line rate that minimizes the total required spectrum to support the given data rate.

5. The method of claim 1, wherein step i) comprises first finding spectral-islands along routes connecting source node s to a destination node d in a single scan of the spectrum availability profiles of fibers, keeping track of spectral-islands using two parameters $M_{ij}$ and $T_{ij}$, where $M_{ij}$ is a lowest wavelength slot of a spectral-island and $T_{ij}$ is a highest wavelength slot of a spectral-island on a fiber (i, j), starting from a lowest wavelength slot t and constructing an auxiliary graph A and width of a spectral-island $(T_{ij}-M_{ij}+1)$ on a fiber (i, j) stating from the wavelength slot t being considered as a weight of a link (i, j) in the auxiliary graph A.

6. The method of claim 5, wherein after construction of the auxiliary graph, the Max-Min Weight Procedure is used to find a route Y such that the minimum width u of a spectral-island (weight) of a link along the route is maximized.

7. The method of claim 6, wherein the Max-Min Weight Procedure returns a route Y and the minimum width u of a spectral-island along the route Y, the width of a spectral-island on each link along the route is at least u and these spectral-islands start at the same wavelength slot t.

8. The method of claim 7, wherein the spectral-islands starting from the wavelength slot t have u amount of spectrum on each link along the route (the spectral continuity constraint) at the same center wavelength (the wavelength continuity constraints), the found width u of a spectral-island in the Max-Min Weight Procedure is recorded in the set Z and according to this width u, $M_{ij}$ and $T_{ij}$ parameters are updated, the links along the found route Y are removed from the auxiliary graph A, and the Max-Min Weight Procedure is repeated until the source node s and destination node d are disconnected.

9. The method of claim 8, wherein after determining all spectral-islands starting from the wavelength slot t, the spectrum-aware rate selection procedure increments the wavelength slot t and repeats the previous steps until the last wavelength slot of a spectrum profile is reached.

10. The method of claim 9, wherein the previous steps yields a set of widths Z of spectral-islands that are available along the routes connecting source and destination nodes.

11. The method of claim 9, wherein step iv) includes finding a set of line rates for a data rate j using the information of spectral-islands Z and the solutions of the lower data rates n, where n<j, wherein in order to find an appropriate set of line rates for the data rate j, first mapping the spectrum of line rates for the data rate n within the widths Z of spectral islands such that the width of a residual spectral-island after the mapping is maximized, and a subset of offered line rates is considered in determining the solution for the data rate j, which requires smaller spectrum than the maximum width of a residual spectral-island.

12. An optical network system with computer implemented spectrum-aware rate selection comprising:
 a non-transitory computer readable code instructions implemented by a computer for finding a set of channels based on spectrum availability information such that the total required spectrum for a requested data rate of a traffic demand is minimized, which includes
 i) code instructions on the computer for finding routes and spectral islands along network routes connecting source and destination nodes while observing spectral continuity and wavelength continuity responsive to an auxiliary graph based approach;
 ii) code instructions on the computer for finding available spectral islands along links in a single scan of spectrum availability profiles; and
 iii) code instructions the computer for finding a route which maximizes a minimum width of a spectral island along the route responsive to a Max-Min Weight procedure.

13. The system of claim 12, further comprising iv) code instructions on the computer for finding a set of line rates for a given data rate using solutions of the smaller data rates and available spectral-islands.

14. The system of claim 3, wherein said iv) code instructions comprise selecting a subset of an offered set of line rates in determining a solution for the data rate using the solutions of the smaller data rates and the available spectral-islands.

15. The system of claim 13, wherein said iv) code instructions comprise selecting a line rate that minimizes the total required spectrum to support the given data rate.

16. The system of claim 12, wherein i) code instructions comprise first finding spectral-islands along routes connecting source node s to a destination node d in a single scan of the spectrum availability profiles of fibers, keeping track of spectral-islands using two parameters $M_{ij}$ and $T_{ij}$, where $M_{ij}$ is a lowest wavelength slot of a spectral-island and $T_{ij}$ is a highest wavelength slot of a spectral-island on a fiber (i, j), starting from a lowest wavelength slot t and constructing an auxiliary graph A and width of a spectral-island $(T_{ij}-M_{ij}+1)$ on a fiber (i, j) stating from the wavelength slot t being considered as a weight $A_{ij}$ of a link (i, j) in the auxiliary graph A.

17. The system of claim 16, wherein after construction of the auxiliary graph, the Max-Min Weight Procedure is used to find a route Y such that the minimum width u of a spectral-island (weight) of a link along the route is maximized.

18. The system of claim 17, wherein the Max-Min Weight Procedure returns a route Y and the minimum width u of a spectral-island along the route Y, the width of a spectral-island on each link along the route is at least u and these spectral-islands start at the same wavelength slot t.

19. The system of claim 18, wherein the spectral-islands starting from the wavelength slot t have u amount of spectrum on each link along the route (the spectral continuity constraint) at the same center wavelength (the wavelength continuity constraints), the found width u of a spectral-island in the Max-Min Weight Procedure is recorded in the set Z and according to this width u, $M_{ij}$ and $T_{ij}$ parameters are updated, the links along the found route Y are removed from the auxiliary graph A, and the Max-Min Weight Procedure is repeated until the source node s and destination node d are disconnected.

20. The system of claim 19, wherein after determining all spectral-islands starting from the wavelength slot t, the spectrum-aware rate selection procedure increments the wavelength slot t and repeats the previous steps until the last wavelength slot of a spectrum profile is reached.

* * * * *